United States Patent [19]
Haas

[11] Patent Number: 5,943,758
[45] Date of Patent: Aug. 31, 1999

[54] FABRICATION OF A HOLLOW COMPOSITE-MATERIAL SHAFT HAVING AN INTEGRAL COLLAR

[75] Inventor: Neal Haas, San Diego, Calif.

[73] Assignee: Grafalloy Corporation, El Cajon, Calif.

[21] Appl. No.: 08/940,935

[22] Filed: Sep. 30, 1997

[51] Int. Cl.⁶ ....................................... B23P 11/00
[52] U.S. Cl. .................. 29/516; 473/318; 264/257; 156/172
[58] Field of Search ...................... 473/318, 319, 473/320, 321; 29/516, 515; 264/257, 258; 156/172

[56] References Cited

U.S. PATENT DOCUMENTS

| | | |
|---|---|---|
| 3,615,999 | 10/1971 | Saudemont et al. . |
| 3,688,017 | 8/1972 | Roots . |
| 4,120,998 | 10/1978 | Olez . |
| 4,292,368 | 9/1981 | Mialon . |
| 4,614,631 | 9/1986 | Daugny . |
| 4,836,545 | 6/1989 | Pompa . |
| 4,853,060 | 8/1989 | Nickel . |
| 4,983,242 | 1/1991 | Reed . |
| 5,131,651 | 7/1992 | You . |
| 5,253,867 | 10/1993 | Gafner . |
| 5,277,423 | 1/1994 | Artus . |
| 5,294,119 | 3/1994 | Vincent et al. . |
| 5,297,791 | 3/1994 | Negishi . |
| 5,413,338 | 5/1995 | Kawamatsu . |
| 5,421,574 | 6/1995 | Yamagishi et al. . |
| 5,545,094 | 8/1996 | Hsu . |
| 5,547,533 | 8/1996 | Berglund . |
| 5,643,105 | 7/1997 | Niswander . |
| 5,735,752 | 4/1998 | Antonious . |

FOREIGN PATENT DOCUMENTS

| | | | |
|---|---|---|---|
| 55-82615 | 6/1980 | Japan | 264/257 |
| 56-95635 | 8/1981 | Japan | 264/258 |
| 57-201625 | 12/1982 | Japan | 264/257 |
| 2-155633 | 6/1990 | Japan | 264/258 |
| 6-91026 | 4/1994 | Japan | 29/516 |

*Primary Examiner*—S. Thomas Hughes
*Assistant Examiner*—John Preta
*Attorney, Agent, or Firm*—Gregory Garmong

[57] ABSTRACT

A hollow golf club shaft is prepared by flag rolling a base layer of composite material pieces over a mandrel having a larger-diameter region and a reduced-diameter region. The base layer is optionally precompacted. A collar is slid along he length of the mandrel having the reduced-diameter region and base layer to lie adjacent to the larger-diameter region, and at least one overlayer composite material piece is flag rolled overlying the base-layer composite material pieces onto that portion of the mandrel having the reduced diameter. The overlayer piece is compacted, preferably along with the base pieces, and all of the composite material is cured

20 Claims, 3 Drawing Sheets

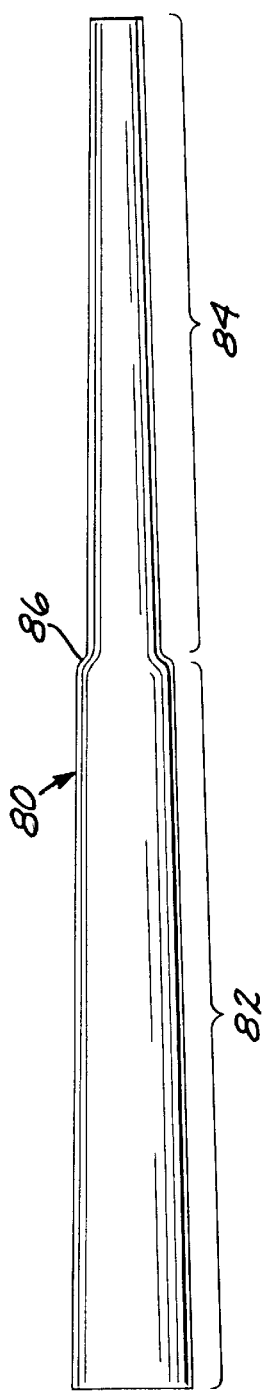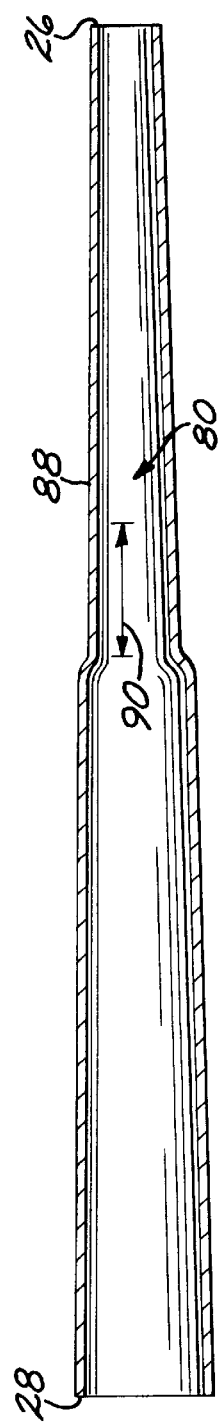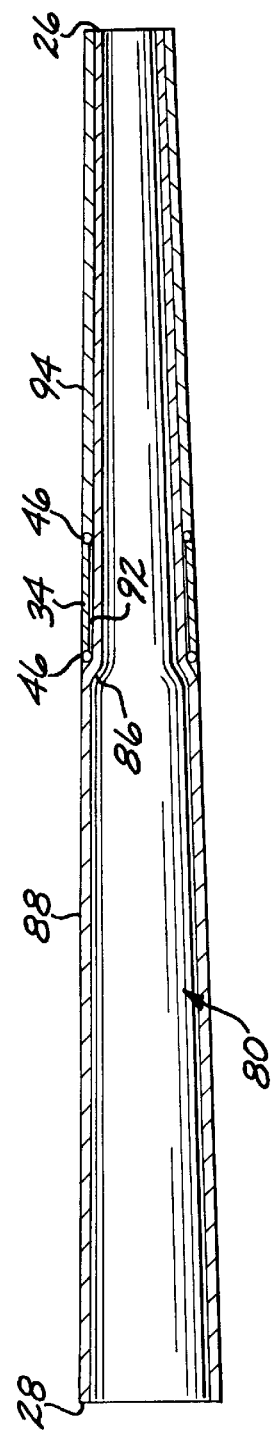

FABRICATION OF A HOLLOW COMPOSITE-MATERIAL SHAFT HAVING AN INTEGRAL COLLAR

BACKGROUND OF THE INVENTION

This invention relates to the manufacture of a shaft made of a composite material, and, more particularly, to the manufacture of such a shaft suitable for use as a golf club shaft.

One type of advanced golf club shaft is hollow and is made of graphite/epoxy composite material. To manufacture such a shaft by a know approach, a mandrel is prepared with an outside diameter of about the inside diameter of the hollow shaft Pieces of material, sometimes termed "flags" or "laminates", made of a prepreg composite meaterial are successively rolled onto the mandrel to build up several layers. The flags are applied in such a fashion that they adhere to the mandrel and to each other sufficiently to permit the buildup of multiple layers. A compaction tape is wound over the rolled flags The mandrel and tape are heated to elevated temperature. The compaction tape applies an external pressure to the flags of composite material, compressing them against the mandrel. With further heating, the epoxy of the composite material cures to form a final cured product. Following curing, the mandrel is removed. Other fabrication techniques such as external or internal bladders and molds may instead be used In an application under development by the inventor, a collar must be affixed to the external surface of the shaft. In one approach known in the art for affixing a collar to the external surface of a shaft and illustrated in FIG. 2 of U.S. Pat. No. 5,277,423, an inner diameter of the collar overlies an outer diameter of the composite material. In another approach illustrated in FIG. 4 of the same patent, a outer diameter of the collar is flush with the outer diameter of the composite material.

As noted in the '423 patent the approach of FIG. 4 has the advantage that it provides a uniform cross-sectional diameter for the shaft. However, it presents a problem in manufacturing the shaft Although the '423 patent does not disclose any manufacturing method for making the FIG. 4 embodiment, it appears from FIG. 4 that a recess is ground into the outer surface of the composite material, and the collar, presumably furnished as two semicylindrical segments, is positioned into the recess and fastened there adhesively. In another approach, the collar could be positioned in the recess of an external female mold and the composite material deformed into the female mold and around the collar by an applied internal presure such as produced by a bladder inside the shaft.

While perhaps operable, each of these manufacturing approaches has distinct disadvantages. The most important disadvantage of using a two-piece collar is that the collar may debond and fall away from the shaft during service, which is unacceptable for a premium product. The most important an disadvantages of the internal pressurizing approach are that an internal bladder is required, that the reinforcement of the composite material must deform around the collar so that the basic internal structure of the shaft is disrupted, and that the approach is more expensive.

There is a need for an improved approach to the manufacture of a composite shaft having an eternal collar, preferably a continuous collar, attached flush with the surface of the shaft. The present invention fulfills this need, and further has related advantages.

SUMMARY OF THE INVENTION

The present invention provides a manufacturing method for making a hollow composite shaft having a continuous collar affixed flush with an external surface of the shaft. The collar is flush, without or intentionally with external grooves, as desired. If the collar is prepared without any external grooves at the ends of the collar, the surface of the collar is smoothly continuous with the surface of the shaft. The patterned orientation of the composite material is minimally disrupted, unlike the distortion that would occur dung some types of possible manufacturing approaches such as molding the composite material around the collar. There is minimal waste of material in the present approach In accordance with the invention, a method for manufacturing a hollow shaft comprises the steps of providing a shaft mandrel having a first size over a first length and a second size over a second length, with the second size being smaller than the first size. The method further includes providing a collar having an inner diameter, and providing composite material including at least one base-layer piece of a composite-material prepreg, and at least one overlayer piece of a composite-material prepreg. The at least one base-layer piece is thereafer applied overlying the first length and the second length of the shaft mandrel, and the at least one base-layer piece is thereafter optionally precompacted. Next the collar is slid along the second length of the shaft mandrel and its overlying at least one base-layer piece to a position adjacent to the length, and the at least one overlayer piece is thereafter applied overlying the at least one base-layer piece at a location overlying at least a portion of the second length and laterally adjacent to the collar. The method includes thereafer compacting the at least one overlayer piece, and curing the at least one base-layer piece and the at least one overlayer piece. The collar may be held in place by an adhesive that prevents it from slipping or turning.

The pieces of composite material are preferably prepregs of carbon fibers embedded in a thermosetting matrix material such as an epoxy. The application of these pieces is accomplished by any operable approach, preferably flag rolling. Alternatively, the structure may be prepared by wet filament winding. The precompacting and compacting are preferably accomplished using compaction tape. The final compacting and curing are preferably accomplished simultaneously, but they may be accomplished sequentially. The dimensions and process steps are desirably selected so that an outer surface of the collar is flush and continuous with the outer surface of the final cured composite material on either side of it, or alternatively flush but intentionally separated from the outer surface of the final cured composite material on either side of it by circumferential recesses.

The collar is preferably a continuous cylindrical (including slightly tapered) piece. The collar is preferably a metal such as aluminum, a ceramic, a plastic, or a composite material. A damping material such as a viscoelastic material may optionally be applied between the uncured upper layer of the prepreg composite material and the inner surface of the collar, as disclosed in U.S. Pat. No. 5,277,423, whose disclosure is incorporated by reference.

The present approach provides a manufacturing technique for preparing a composite shaft such as a golf shaft with a collar affixed flush to the outer surface of the shaft. The approach is fully compatible with other aspects of mandrel-based manufacturing procedures. The orientations and bonding of the layers of the composite material are not substantially distorted in the manufacturing process or in the final product, leading to minimal reduction in strength and modification of the flexing behavior of the shaft. The collar may be positioned and sized to affect and control the flexure, weight, and/or balance of the shaft. The present approach adds only minimally and acceptably to the cost of manufacture of the shaft. Other features and advantages of the present invention will be apparent from the following more detailed description of the preferred embodiment, taken in conjunction with the accompanying drawings, which illustrate, by way of example, the principles of the invention. The scope of the invention is not, however, limited to this prefered embodiment.

BRIEF DESCRIPTION OF THE DRAWINGS

FIG. 4 is a sectional view of the mandrel;

FIG. 5 is a sectional view of the mandrel and shaft at a first intermediate stage of manufacturing; and FIG. 6 is a sectional view of the mandrel and shaft at a second intermediate stage of manufacturing.

DETAILED DESCRIPTION OF THE INVENTION

Figure 1:
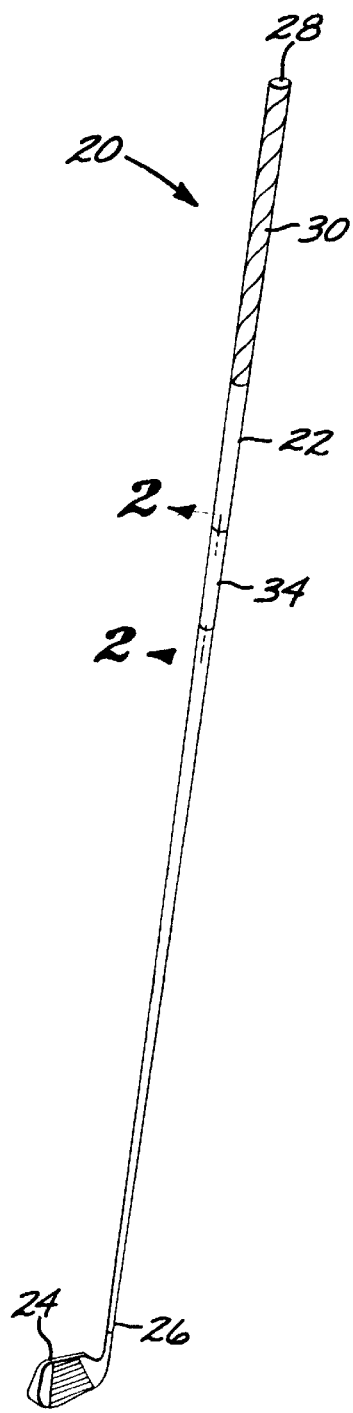
FIG. 1 is a perspective view of a golf club.

FIG. 1 illustrates a golf club 20 having, a shaft 22 and a head 24 affixed to a tip end 26 of the shaft 22. The shaft 22 has a butt end 28 with a grip 30. The shaft 22 is generally in the form of a hollow cylinder, tapering in outer diameter from a larger diameter at the butt end 26 to a smaller diameter at the tip end 26.

Figure 2:
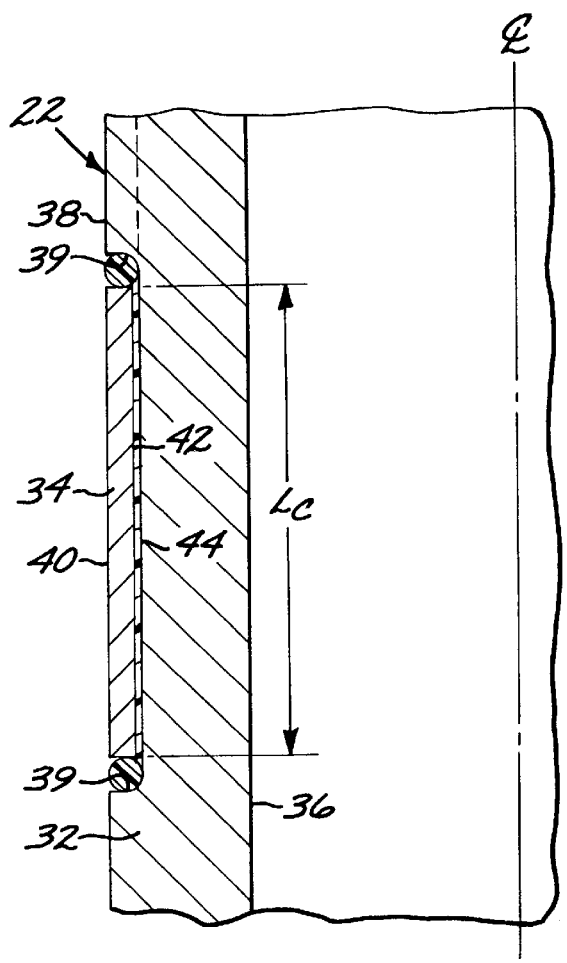
FIG. 2 is a fragmented sectional view of the golf club of FIG. 1, taken along lines 2—2.

FIG. 2 is a sectional view of the hollow shaft 22. The shaft 22 includes a shaft body 32 with a collar 34 positioned at an intermediate location along the length of the shaft 22 between the butt end 28 and the tip end 26. The collar 34 is circumferentially unsealed and continuous, and extends for a distance $L_c$ along the length of the shaft 22. The body 32 of the shaft 22 has an inner surface 36 and an outer surface 38, and the collar 34 has an outer surface 40 and an inner surface 42. In the illustrated embodiment, the outer surface 40 of the collar 34 is substantially flush with and smoothly continuous with, the outer surface 38 of the body 32 of the shaft 22. In another embodiment, the outer surface 40 of the collar is substantially flush with the outer surface 38 of the body 32 of the shaft 22, but the outer surface 38 is intentionally separated from the outer surface 38 on each end of the collar 34 by a circumferentially extending recess 39, indicated in dashed lines in FIG. 2. In another embodiment, the collar 34 is contoured, as for example with a convex outward bowing. Optionally, a viscoelastic layer 44 of a material such as a conformable foam adhesive tape, such as 3M product number VHB 4926, lies between the collar 34 and the body 32 of the shaft 22.

Figure 3:
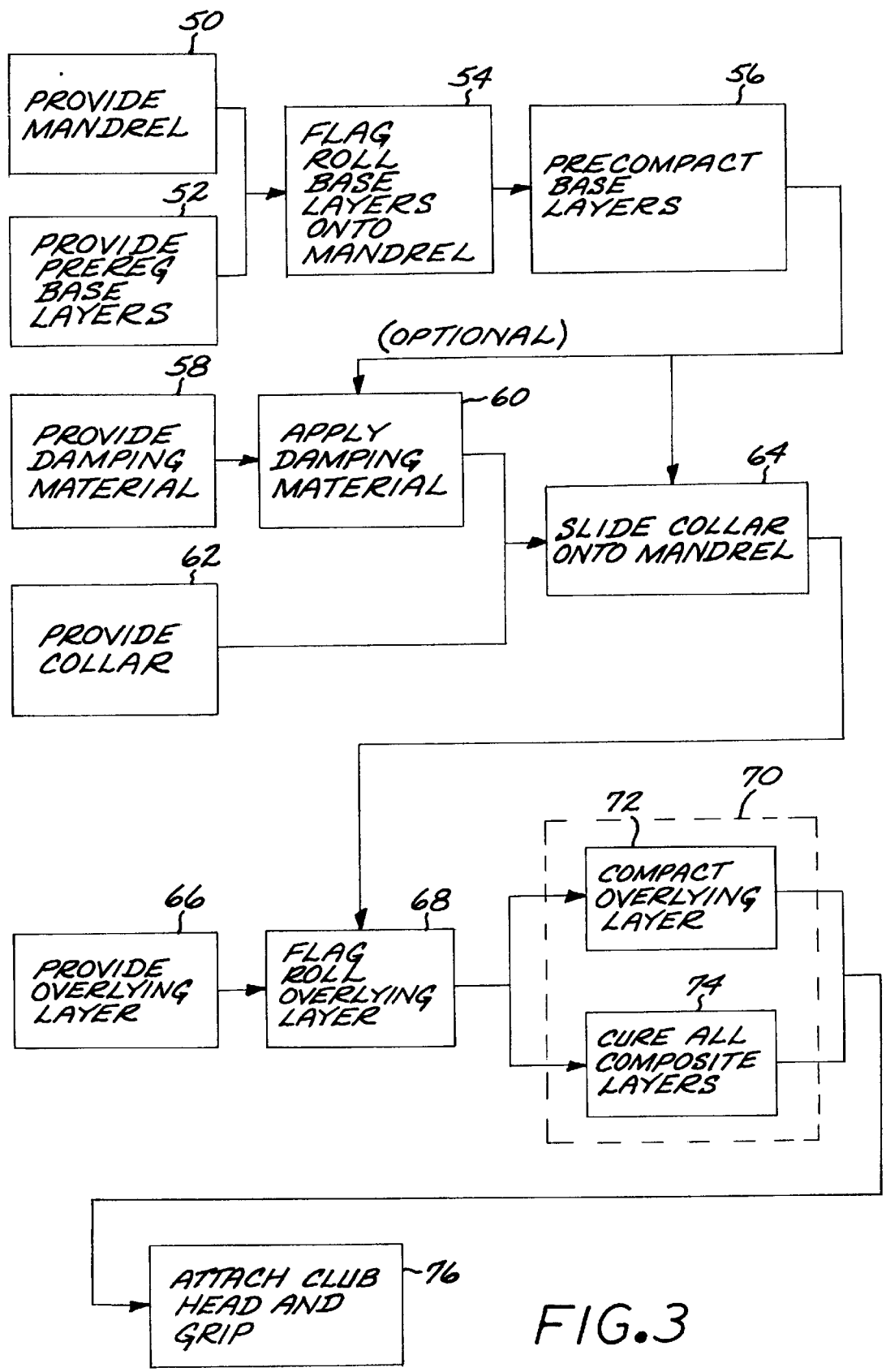
FIG. 3 is a block flow diagram of a preferred manufacturing method.

FIG. 3 illustrates a preferred flag-rolling method for manufacturing the shaft 22 and the golf club 20 of FIGS. 1 and 2, but the present approach may be used with other operable fabrication technique. A mandrel 80 is provided, numeral 50. The mandrel 80 has a diameter which is tapered over its length. The mandrel 80, shown in greater detail in FIG. 4, includes a first length 82 and a second length 84, joined at a transition region 86. The first length 82 has a first cross-sectional shape, preferably a tapered cylinder, and the second length 84 has a second cross-sectional shape, preferably a tapered cylinder. The size of the second cross-sectional shape is smaller than the size of the first-cross sectional shape or, in the preferred forms, the diameter of the tapered cylinder over the second length 84 is everywhere smaller than the diameter of the tapered cylinder over the first length 82. The sizes are preferably selected so that, after the layers of composite material and the collar are applied and the composite material compacted and cured, as described subsequently, the outer surface of the collar is flush with the surface of the shaft. The mandrel 80 is typically made of steel.

At least one, and preferably a plurality of, base-layer pieces of composite-material prepreg are provided, numeral 52. Any operable composite material may be used. The base-layer pieces are preferably unidirectional prepreg composite material. These pieces, also termed "flags" because in many cases they are cut to a pennant shape before application, are typically single plies, each about 0.005–0.006 inches thick, comprising, carbon-fiber tows embedded in a thermosetting resin matrix material such as an epoxy. These single plies are widely available commercially from several manufacturers. The single plies may all be of the same material, or different materials may, be used as the various base-layer pieces. Additional layers of materials may be provided as necessary, such as scrim cloth and the like.

The base-layer pieces are sequentially applied to the surface of the mandrel 80, numeral 54. The base-layer pieces are preferably rolled onto the surface of the mandrel 80 in a process termed flag rolling. (Equivalently for the present purposes, the pieces of composite material could be applied by other techniques, but the preferred flag rolling procedure will be discussed here.) The basic procedures of flag rolling are known in the art and will be described only briefly. In flag rolling, a base-layer piece, whose surface is somewhat tacky at room temperature, is properly oriented on a flat table. The mandrel 80 is placed onto the surface of the base-layer piece at one edge thereof, and rolled across the piece so that the base-layer piece is rolled onto the mandrel. If more than one base-layer piece is used, as is ordinarily the case, the flagrolling process is repeated for each of the base-layer pieces. Some of the base-layer pieces are flag rolled on top of the preceding base-layer pieces, and others are flag rolled onto different regions of the mandrel. The first length 82, the transition 86, and the second length 84 are thereby covered with at least one layer, and usually multiple layers, of the first-layer prepreg composite material. The positioning, orientations, and thicknesses of the base-layer pieces are the same as for procedures already known in the art, and their selection does not form part of the present invention.

When the base-layer pieces are applied to the mandrel 80, there is typically some porosity within the overlying layers. That porosity is reduced and preferably eliminated by optionally precompacting the applied base-layer pieces, numeral 56. To effect precompacting, a compaction cello tape such as B-500 are available from Flexicon or HTP tape is wrapped under tension in a spiral fashion around the layers of base-layer pieces to compress the layers of base-layer pieces radially inwardly without curing the polymeric resin matrix material. After precompaction is complete, the compaction tape is removed.

The result of the flag rolling and pre-compaction of the base-layer pieces onto the mandrel 80 is shown in FIG. 5. A body region 88 of the layers of base-layer pieces is supported on the mandrel 80. The body region 88 has the general shape of the body 32 of the shaft 22 over most of its length, but is not cured and is lacking the collar 34 and the final layers of composite material over most of the second length 84.

Optionally, and for one application of interest a damping material is provided, numeral 58. Such damping materials are known in the art and are disclosed, for example, in U.S. Pat. No. 5,277,423. A preferred damping material is a conforming foam adhesive tape, commercially available from 3M as product number VHB 4926. The damping material may also be an adhesive. When used, the damping material is applied, numeral 60, to the outer surface of the precompacted base-layer pieces in a collar region 90 as a damping material layer 92 which, in a subsequent step, is immediately beneath and is covered by the collar 34.

The collar 34 is provided, numeral 62, and is thereafter slid onto the mandrel and overlying optionally precompacted base-layer pieces, numeral 64, from the smaller tip end 26 and over the second length 84, to a position adjacent to the transition 86 and thence adjacent to the first length 82. The collar 34 overlies the collar region 90 and, where provided, the damping layer 92. If it is desired to provide the recesses 39 at the lateral ends of the collar 34 in the final product, an O-ring 46 of appropriate size is slid onto the mandrel ahead of the collar 34, and another O-ring of appropriate size is slid onto the mandrel following the collar 34. The O-rings may be made of any operable material, such as rubber, polytetrafluoroethylene, or silicone, or they may be made of metal, ceramic, plastic or the like. Where such rings are used, the rings and the collar are forced longitudinally together during assembly. FIG. 6 shows the use of two such O-rings 46, but instead one or both may be omitted. The O-ring(s) may be removed after subsequent compaction or left in place as trim.

At least one overlayer piece of a composite material-prepreg is provided, numeral 66. This overlayer piece is preferably of the same type and composition as the base-layer pieces described previously, but it may be of a different composition. The overlayer piece is in the form of a flag and may be provided as one or more plies.

The overlayer piece 94 is applied to the surface of the mandrel and the precompacted base-layer pieces, numeral 68, preferably by flag rolling in the same manner as described previously. The overlayer piece 94 is applied overlying that portion of the second length 84 that does not include the collar region 90. As shown in FIG. 6, the collar 34 is longitudinally captured between the base-layer pieces at the transition 86 and the overlayer piece 94. The overlayer piece 94 may extend for a substantial distance along the length of the shaft 22, as illustrated in FIG. 6, or it may be relatively short and effectively constitute only a short transition in diameters to hold the collar in place.

The overlayer piece 94 is compacted, numeral 72, and the body region 88 and overlayer piece 94 are cured, numeral 70. The compacting 72 and curing 74 are preferably performed simultaneously, but may be performed sequentially with the compacting performed first followed by the curing. In the preferred approach, compaction tape of the same type as described previously is spirally wound under tension around the base-layer pieces, the collar, and the overlayer piece of composite material on the mandrel. The compaction tape may be in the form of shrink-wrap tape. In that case, the assembly is heated to a temperature sufficient that the shrink-wrap tape contracts to compress and compact the overlayer piece, and also the base-layer pieces, to the extent that any further compaction is possible. Other operable compaction techniques may be used as well.

The assembly is heated to a temperature and for a time sufficient to cure the thermosetting matrix material of the base-layer pieces and the overlayer piece, numeral 74. The curing is accomplished according to any operable temperature-time schedule appropriate to the polymeric resin matrix material. As an example of a practical application, the steps 72 and 74 are accomplished by continuously heating the assembly shown in FIG. 6 to a temperature of about 300° F. and maintaining that temperature for a time of about 2½ hours for the case of the preferred epoxy matrix material.

The assembly is removed from the curing oven. The mandrel is removed from the shaft by sliding it lengthwise out of the shaft body 32. The shaft is thereafter optionally but preferably processed by any operable technique, such as sanding, painting, and cutting to length rings 46 were used, the rings at one or both ends of the collar 34 may be removed to create the recess 39, or left in place as trim.

The thickness of the body region 88 of base-layer composite material, the thickness of the collar 34, and the thickness of the overlayer piece 94 are chosen so that, after compaction 72 and curing 74, the surfaces 38 and 40 have a predetermined relationship, typically flush with each other. Any longitudinal discontinuities between the collar 34 and the composite material on either side of it (except as may be intentionally present due to the use of the rings 46), are eliminated by flow of the resin matrix of the composite material during heating but prior to curing. The result is a flush surface as shown in FIG. 2, without or intentionally with the recesses 39.

The approach of the invention has been practiced using a mandrel and material suitable for the production of a golf-club shaft. The mandrel was a 60-inch long tapered cylinder. The diameter of the mandrel was 0.550 inches at the butt end, 0.526 inches on the first-length side of the transition, 0453 inches on the second-length side of the transition, and 0.180 inches at the tip end. The base-layer pieces and the overlayer piece were P900 carbon-epoxy prepreg composite material available commercially from Toray. The outer diameter of the body region was 0.515 inches under the collar region 90, prior to curing. The thickness of the overlayer buildup was 0.030 inches prior to compaction and curing. The collar was an aluminum annulus about 3 inches long 0.610 inches in outer diameter, and 0.021 inches in thickness. After compaction and curing, the shaft had the appearance shown in FIGS. 1 and 2.

After compaction and curing and any optional preparation steps, the club head 24 and grip 30 are attached, numeral 76, to complete manufacture of the golf club 20. The head and grip are attached by any operable technique.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for manufacturing a hollow shaft, comprising the steps of:
   providing a shaft mandrel having a first size over a first length and a second size over a second length, the second size being smaller than the first size;
   providing a collar having an inner diameter;
   providing composite material including
     at least one base-layer piece of a composite-material, and
     at least one overlayer piece of a composite-material; thereafter
   applying the at least one base-layer piece overlying the first length and the second-length of the shaft mandrel; thereafter sliding the collar along the second length of the shaft mandrel and the at least one base-layer piece to a position adjacent to the first length; thereafter applying the at least one overlayer piece overlying the at least one base-layer piece at a location overlying at least a portion of the second length and laterally adjacent to the collar; thereafter compacting the at least one overlayer piece; and curing the at least one base-layer piece and the at least one overlayer piece.

2. The method of claim 1, including an additional step, after the step of applying the at least one base layer and before the step of sliding, of precompacting the at least one base-layer piece.

3. The method of claim 2, wherein the step of precomputing the at least one base-layer piece includes the step of applying compaction tape overlying the at least one base-layer piece, and heating the compaction tape and the at least one base-layer piece.

4. The method of claim 1, wherein the step of providing composite material includes the step of providing the at least one base-layer piece and the at least one overlayer piece as prepregs of carbon fibers in a thermosetting material matrix.

5. The method of claim 1, wherein the step of applying the at least one base-layer piece includes the step of flag rolling the at least one base-layer piece.

6. The method of claim 1, wherein the step of compacting the at least one overlayer piece includes the step of applying compaction tape overlying the at least one overlayer piece, and heating the compaction tape and the at least one overlayer piece.

7. The method of claim 1, wherein the step of compacting the at least one overlayer piece and the step of curing are preformed simultaneously.

8. The method of claim 1, wherein the step of providing a collar includes the step of providing a collar made of a material selected from the group consisting of a metal, ceramic, plastic, and a composite material.

9. The method of claim 1, wherein the steps of providing a shaft mandrel, providing a collar, providing composite material, applying the at least one base-layer piece, applying the at least one overlayer piece, compacting the at least one overlayer piece, and curing are cooperatively selected so that a final surface of shaft comprises the collar flush with cured composite material on each side of the collar.

10. The method of claim 1, wherein the step of providing a shaft mandrel includes the step of providing a shaft mandrel sized such that the shaft is operable as a golf club shaft.

11. The method of claim 1, further including an additional step, after the step of applying the at least one base-layer piece and before the step of applying the at least one overlayer piece, of sliding an O-ring along the shaft mandrel, the O-ring being positioned at a location selected from the group consisting of ahead of the collar and behind the collar.

12. A method for manufacturing a hollow shaft, comprising the steps of:

providing a shaft mandrel having a first diameter over a length and a second diameter over a second length, the second diameter being smaller than the first diameter;

providing a collar having an inner diameter;

providing composite material including
a plurality of base-layer pieces of a composite-material prepreg, and
at least one overlayer piece of a composite-material prepreg; thereafter applying the plurality of base-layer pieces overlying the shaft mandrel; thereafter precompacting the plurality of base-layer pieces; thereafter sliding the collar along the second length of the shaft mandrel and its overlying precompacted plurality of base-layer pieces to a position adjacent to the first length; thereafter applying the at least one overlayer piece overlying at least some of the plurality of base-layer pieces at a location overlying at least a portion of the second length and laterally adjacent to the collar; thereafter compacting the at least one overlayer piece; and curing the plurality of base-layer pieces and the at least one overlayer piece.

13. The method of claim 12, wherein the step of precompacting includes the step of precompacting the plurality of base-layer pieces to a diameter of about that of an inner diameter of the collar.

14. The method of claim 12, wherein the step of providing composite material includes the step of providing the plurality of base-layer pieces and the at least one overlayer piece as prepregs of carbon fibers in a thermosetting material matrix.

15. The method of claim 12, wherein the step of applying the plurality of base-layer pieces includes the step of flag rolling the plurality of base-layer pieces sequentially.

16. The method of claim 12, wherein the step of compacting the at least one ovelayer piece and the step of curing are preformed simultaneously.

17. The method of claim 12, wherein the steps of providing a shaft mandrel providing a collar, providing composite material, applying the plurality of base-layer pieces, precompacting, applying the at least one overlayer piece, compacting the at least one overlayer piece, and curing are cooperatively selected so that a final surface of the shaft comprises the collar flush with cured composite material on each side of the collar.

18. The method of claim 12, wherein the step of providing a shaft mandrel includes the step of providing a shaft mandrel sized such that the shaft is operable as a golf club shaft.

19. The method of claim 12, further including an additional step, after the step of applying the at least one base-layer piece and before the step of applying the at least one overlayer piece, of sliding an O-ring along the shaft mandrel, the O-ring being positioned at a location selected from the group consisting of ahead of the collar and behind the collar.

20. A method for manufacturing hollow shaft comprising the steps of:

providing a shaft mandrel having a diameter over a first length and a second diameter over a second length, the second diameter being smaller than the first diameter, the total of the first length and the second length of the shaft mandrel being selected such that the shaft is operable as a golf club shaft;

providing a collar having an inner diameter;
providing composite material including
   a plurality of base-layer pieces of a composite-material prepreg, and
   at least one overlayer piece of a composite-material prepreg; thereafter
applying the plurality of base-layer pieces overlying the shaft mandrel; thereafter
precompacting the plurality of base-layer pieces; thereafter
sliding the collar along the second length of the shaft mandrel and its overlying precompacted plurality of base-layer pieces to a position adjacent to the first length; thereafter
applying the at least one overlayer piece overlying at least some of the plurality of base-layer pieces at a location overlying at least a portion of the second length and laterally adjacent to the collar; thereafter
compacting the at least one overlayer piece; and simultaneously
curing the plurality of base-layer pieces and the at least one overlayer piece.

* * * * *